Patented July 9, 1940

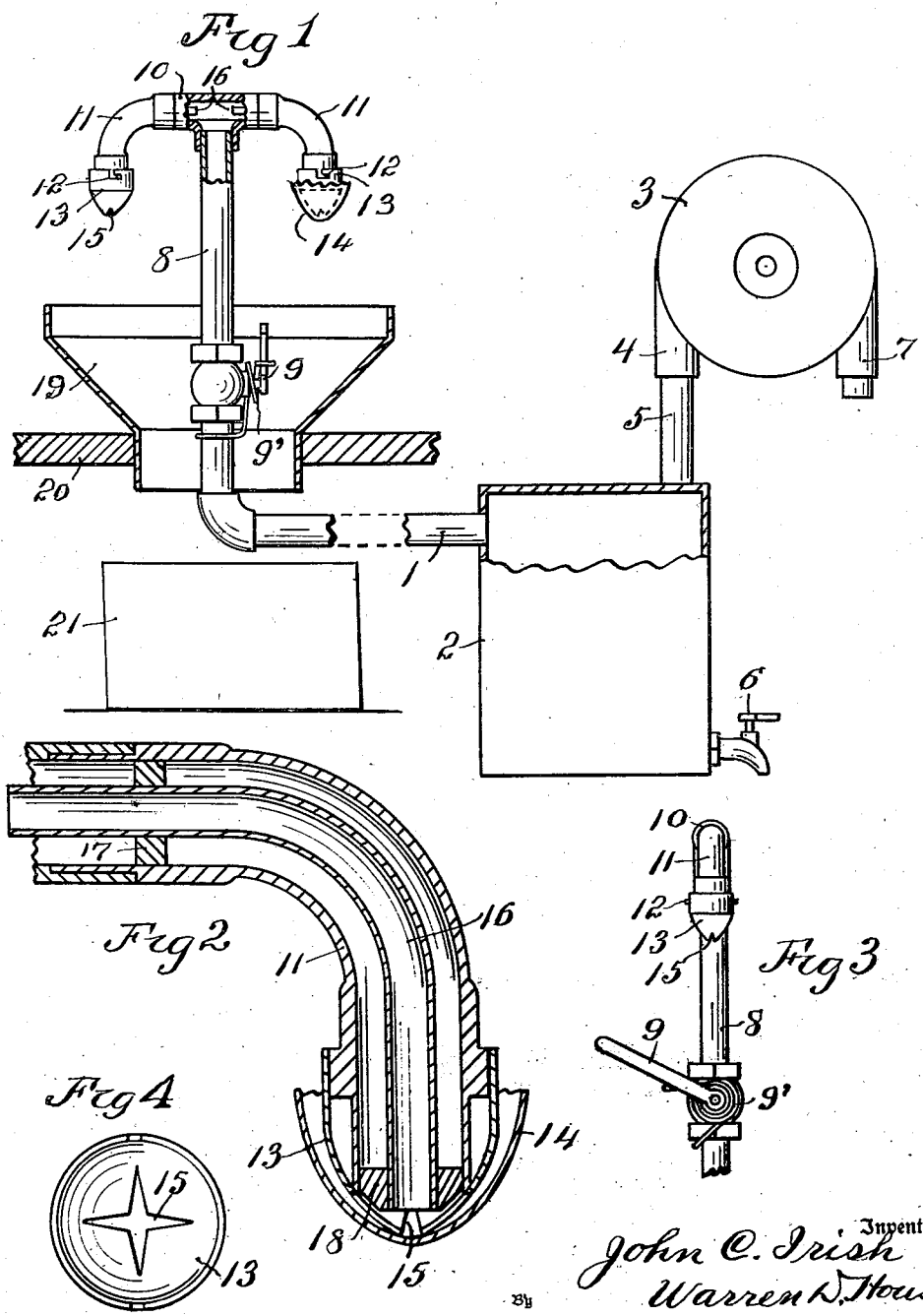

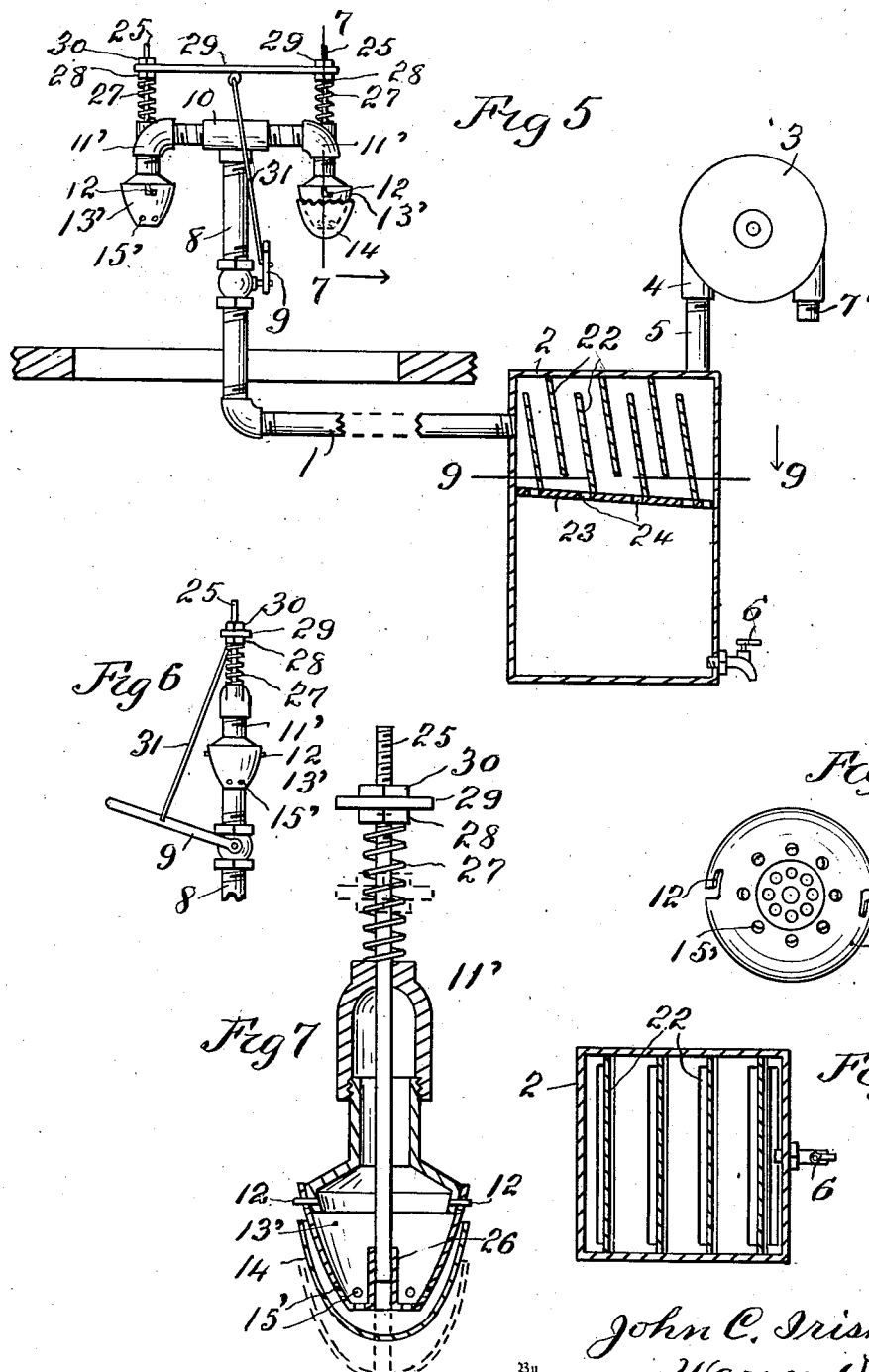

2,206,959

UNITED STATES PATENT OFFICE 2,206,959

METHOD AND APPARATUS FOR SALVAGING LIQUID EGG MATERIAL

John C. Irish, Kansas City, Mo.

Application February 25, 1938, Serial No. 192,518

16 Claims. (Cl. 146—2)

My invention relates to improvements in methods and apparatus for salvaging liquid egg material.

One of the objects of my invention is the provision of a novel method and apparatus for extracting and saving in a sanitary condition, the liquid egg material which has remained in broken egg shells, after the greater portion of the contents of the eggs has been removed.

Another object of my invention is the provision of novel means by which the liquid egg material is extracted from the egg shell by causing a current of air to enter at the open end of the shell and pass along the inner wall thereof to the middle portion of the shell and out, together with the egg material picked up by and carried with it, through a conduit and discharged into a container, whereby the egg material so salvaged is not contaminated by contact with external objects.

Still another object of my invention is the provision of novel means for supporting the egg shell open end up, and withdrawing the liquid egg material by suction, whereby after the material has been withdrawn and the suction in the egg shell has been discontinued, the shell will drop by gravity, the suction effect supporting it during the extracting operation, thereby permitting the operator freedom for the breaking another shell.

Another object of my invention is the provision of extracting means by which a maximum of the egg residue is recovered at a minimum of time and cost.

Still another object of my invention is the provision of a novel apparatus which is simple, cheap to make, easy to operate, not likely to get out of order, and efficient in its operation.

My invention provides still further a conduit with a novel suction head adapted for insertion into the broken shells for withdrawing therefrom the residual egg material.

Another object of my invention is the provision of novel means for automatically restoring the air current after its discontinuance.

The novel features of my invention are hereinafter fully described and claimed.

In the accompanying drawings, which illustrate my invention,

Fig. 1 is a view, partly in side elevation, and partly broken away, and partly in vertical section, of the preferred form of my invention.

Fig. 2 is an enlarged vertical sectional view of a portion of the conduit shown in Fig. 1.

Fig. 3 is a side elevation of a portion of the conduit shown in Fig. 1.

Fig. 4 is an enlarged top view of the semi-ovoid air intake member of one of the suction heads.

Fig. 5 is a view similar to Fig. 1, of a modified form of my apparatus.

Fig. 6 is a side elevation of a portion of the conduit shown in Fig. 5.

Fig. 7 is an enlarged section on the line 7—7 of Fig. 5.

Fig. 8 is an enlarged bottom view of the partly ovoid formed member of one of the suction heads shown in Fig. 5.

Fig. 9 is a section on the line 9—9 of Fig. 5.

Similar reference characters designate similar parts in the different views.

Referring to Figs. 1 to 4, this apparatus is provided with a conduit comprising piping having a horizontal discharge portion 1 fitted into a hole through one side of a closed egg material receiver, comprising a can 2, adjacent to the upper end of the receiver 2.

3 is a casing of a rotary air exhaust pump, the air intake end 4 of which is connected by a pipe 5 to the top of the receiver 2. 7 is the discharge portion of the pump.

The receiver 2 has near its bottom a draw off faucet 6 through which is drawn the liquid egg material which is discharged into the receiver 2 through the portion 1 of the conduit.

The conduit has a vertical portion 8 which includes a shut off valve 9, that serves as means for stopping the air flow through the conduit without stopping the pump 3.

To the top of the conduit portion 8 is affixed a T joint 10, to which are respectively affixed the upper ends of two downwardly extending curved pipes 11, to the lower ends of which are respectively removably attached by bayonet joints 12, two suction heads 13, which are alike and are of semi-ovoid form, and which are of such diameter as to be adapted to be inserted into a severed half of an egg shell 14, shown in Figs. 1 and 2, with the small end of the head against the inner side of the closed end of the shell, Fig. 2. Each ovoid suction head 13 is provided at its small end with an intake opening 15.

Disposed in each pipe 1, concentric therewith and spaced therefrom, is a curved pipe 16, supported centrally in the pipe 11 by two collars 17 and 18, the latter being disposed at the intake end of the pipe 11. The intake end of the pipe 16 communicates with the intake opening 15, adjacent thereto, the area of the opening 15, preferably being greater than the cross-sectional area of the opening through the pipe 16. The upper ends of the pipes 16 extending into the T joint 10, Fig. 1.

Below the suction heads 13 is a funnel 19 extending through a board 20 by which the funnel 19 is supported in position for catching egg shells, which drop from the suction heads 13 through the funnel 19 into an egg shell container 21, disposed under the funnel 19.

A coil spring 9' engaging the valve handle 9 and the pipe 8 turns the valve 9 automatically to the open position, after the operator has shut the valve to stop the air flow and permit the shells 14 to drop from the suction heads 13.

In the operation of the form of my apparatus, shown in Figs. 1 to 4, the pump 3 is operated to draw air through the pipe 5 from the receiver 2, and through the conduit already described.

The operator severs an egg into halves 14, empties most of the contents, and then applies the shells 14, open ends up to the suction heads 13, the spring 9' having turned the valve 9 open.

The air will be drawn into the open ends of the shells 14, and thence downwardly along the inner walls, and between the walls and the suction heads 13 to the lower ends of the shells, thus forming annular air current which will pick up and carry the liquid egg material. The air current with the egg material will then pass upwardly through the inlet openings 15 in the suction heads 13, thence through the pipes 16, T 10, pipes 8 and 1 and the valve 9 into the receiver 2, where the egg material remains, the air passing through the pipe 5 and pump 3 to the atmosphere.

The operator then closes the valve 9, thus shutting off the air flow, upon which the shells 14 will drop by gravity through the funnel 19 into the container 21, at which time the operator will release the valve 9, which will then be opened by the spring 9', thus reestablishing the air current. In the meantime the operator will sever another egg into halves and apply the shells thereof to the suction heads 13, thereby starting another cycle in the operation.

The egg material after being extracted from the shells and deposited in the receiver 2, will not have contacted with outside objects, with liability of being contaminated, but will be in a sanitary condition, and will have a maximum of trade value.

The suction heads 13 being removable from the pipes 11, access to their interiors and to the interior of the conduit parts, make it an easy operation to clean the suction heads and the conduit.

Referring to the form shown in Figs. 5 to 9, the general structure corresponds to that shown in Figs. 1 to 4, and similar parts are designated by similar reference characters.

The receiver 2 has in its upper part upstanding baffle plates 22 alternately attached at their upper and lower ends to the upper end of the receiver 2 and to an inclined plate 23 fastened at its edges to the four walls of the receiver, and having perforations 24 through which the egg material is dropped after it has been discharged into the receiver from the pipe 1. The baffles prevent possible withdrawal of any of the egg material by the pump 3.

The suction heads 13' are fitted onto pipes 11', corresponding to the pipes 11, and are fastened thereto by bayonet joints 12.

The inner pipes 16 are eliminated, and the pipes 11' have fitted in them vertical slidable rods 25 which extend upwardly out of the pipes 11', their lower ends being slidable in tubes 26 extending upwardly from the bottoms of the suction heads 13', Fig. 7. Coil springs 27 encircle the rods 25 and bear at their lower ends on the pipes 11', and at their upper ends against nuts 28 on the rods 25, thus normally forcing upwardly the horizontal plate 29, which is mounted on the nuts 28 on the rods 25, and clamped thereon by nuts 30 on the rods 25 above the plate 29.

A rod 31 is attached at its lower end to the valve handle 9 and at its upper end to the middle of the plate 29. When the valve handle 9 is swung down to shut off the air current, the rod 31 pulls down the plate 29 and the rods 25, which extend through the suction heads 13', and the rods 25 strike and detach the shells 14 from the suction heads 13', after the egg material has been removed from the shells. On releasing the handle 9, the springs 27 force the rods 25 and the plate 29, and rod 31 upward, thus turning the valve handle 9 to the open position automatically. The operator then applies two more shells to the suction heads 13', thus starting another cycle. In other respects, than those noted, the description relating to the form shown in Figs. 1 to 4 applies to the form shown in Figs. 5 to 9.

The lower end portions of the suction heads 13', as shown, have perforations 15' for receiving therethrough the air and egg material from the shell, serving the same function, as the openings 15 of the form shown in Fig. 1.

As shown in the drawings, the annular space between the egg shell and the suction head enlarges gradually in thickness from the closed end of the shell to its open end. This effects an increased force in the air current.

By having the cross-sectional area of the pipes 16 less, or not greater, than the area of the opening 15, churning and back flow in the pipes 16 is avoided and whipping of the egg material is eliminated.

By employing suction in the creation of the air current which extracts the egg material from the shells, there are several advantages:—a sanitary operation, increasing the quality and the value of the material salvaged; the elimination of whipping, the automatic holding of the shells to the suction heads, and their automatic release on shutting the current from the suction heads, thus resulting in increased speed of operation, due to the freeing of the operator from effecting these functions, and reducing the cost of salvaging the egg material. With the employment of means by which the current of air is automatically restored after being cut off, the operator is freed from effecting this function, thus making an additional saving of time, and a speeding up of the operation.

Other modifications of my invention, within the scope of the appended claims, may be made, without departing from the spirit of my invention.

What I claim is:

1. The method of extracting liquid egg material from the severed half of an egg shell, consisting in causing an air current to pass inwardly at the open end of the shell along the inner wall to the closed end of the shell, and thence centrally out of the shell, carrying with it under control the liquid egg material.

2. The method of extracting liquid egg material from the severed half of an egg shell, consisting in withdrawing air from the central portion of the closed end of the shell, and under control, thereby causing an air current to enter at the open end of the shell, guiding the current of air, which picks up and carries with it the liquid egg material, along the inner wall of the shell to the central portion thereof, and thence centrally under control out of the shell.

3. The method of withdrawing liquid egg material from the severed half of an egg shell, consisting in causing an annular current of air to pass inwardly at the open end of the shell and along the inner wall to the central portion thereof at the closed end of the shell, and thence centrally under control, together with the liquid egg material which it picks up, out of the shell.

4. The method of extracting liquid egg material from the severed half of an egg shell, consisting in disposing the shell open end up, and then causing an air current to pass inwardly at the open end and thence downwardly along the inner wall to the lower closed portion of the shell, and thence centrally upwardly under control, together with the liquid material picked up by it, out of the shell.

5. The method of extracting liquid egg material from the severed half of an egg shell, consisting in disposing the shell open end up against an abutment, withdrawing air from the shell from the open end of the shell downwardly along the inner wall of the shell, and thence upwardly out of the shell, and with the withdrawn air the egg material which it picks up, the outer air pressure against the outer side of the shell holding it against said abutment, during said withdrawal of the air, the shell being permitted to fall by gravity when said withdrawal of the air is reduced below a given amount.

6. The method of extracting liquid egg material from the severed half of an egg shell, consisting in disposing the shell open end up against a tubular abutment, withdrawing air from the shell through said abutment from the open end of the shell downwardly along the inner wall of the shell to the lower portion thereof, and thence upwardly, with the egg material it picks up, out of the shell through said abutment, whereby the shell is held by outer air pressure against said abutment, whereby it will fall by gravity therefrom, when withdrawal of air from the shell ceases.

7. The method of extracting liquid egg material from the severed half of an egg shell, consisting in disposing the shell open end up against an abutment, withdrawing the air from the shell from the open end of the shell downwardly along the inner wall of the shell, and thence upwardly within the shell, with the egg material which it picks up, whereby the outer air pressure holds the shell against said abutment during the air withdrawal, and ceasing such withdrawal after the egg material has been removed from the shell, whereby the shell will be permitted to drop by gravity from said abutment.

8. The method of extracting liquid egg material from the severed half shells of an egg, consisting in simultaneously withdrawing air from the shells through the open ends thereof and along the inner walls thereof to the middle portions of the shells and thence, with the egg material picked up by the withdrawn air, under control, out of the two shells.

9. The method of extracting liquid egg material from the severed half shells of an egg, consisting in disposing the shells open ends up against two tubular abutments respectively, then withdrawing air from the shells from their open ends downwardly along their inner walls to their lower central portions, and thence, together with the egg material picked up by the withdrawn air, out of the shells with the withdrawn air and material carried thereby under control.

10. The method of withdrawing liquid egg material from the severed half of an egg shell, consisting in causing an air current to pass inwardly at the open end of the shell along the inner wall to the closed end of the shell, and thence centrally out of the shell, thereby carrying with it the liquid egg material, and following the shutting off of the current through the shell, automatically restoring the current for the extraction of the egg material from another egg shell.

11. Apparatus for removing remnant liquid egg material from egg shell halves comprising a nozzle having its external surface shaped to conform to the inner surface of an egg shell half and to extend into the open end of the egg shell half but spaced from the side walls thereof, said nozzle being positioned to extend downwardly and having its opening facing downwardly, a conduit connected to the upper end of said nozzle, and means for establishing sub-ambient pressure within said conduit, whereby said egg shell is held against said nozzle without other means of support and said ramnant liquid egg material is withdrawn from said egg shell through said conduit.

12. Apparatus for removing remnant egg material from egg shell halves including a suction nozzle adapted to have an egg shell half disposed over the end thereof, an egg material receiver, a conduit connecting said nozzle to said receiver, means for establishing a flow of gaseous fluid through said nozzle and said conduit into said receiver, whereby remnant egg material is carried by the gaseous fluid into said receiver, and a plurality of baffles alternately attached to opposite wall portions of said receiver and spaced from the adjacent wall portion of said receiver at their opposite ends.

13. Apparatus for removing remnant egg material from egg shell halves including a suction nozzle adapted to have an egg shell half disposed over the end thereof, an egg material receiver, a conduit connecting said nozzle to said receiver, means for establishing a sub-atmospheric pressure within said receiver, valve means in said conduit for shutting off communication between said nozzle and said receiver, means mechanically interlocked with said valve means for forcing said egg shell half off said nozzle upon closure of said valve means, and means for biasing said valve means to its open position.

14. Apparatus for removing remnant liquid egg material from egg shell halves comprising a nozzle having its external surface shaped to conform to the inner surface of an egg shell half and to extend into the open end of the egg shell half but spaced from the side walls thereof, said nozzle being positioned to extend downwardly and having its opening facing downwardly, a conduit connected to the upper end of said nozzle, means for establishing sub-ambient pressure within said conduit, whereby said egg shell half is held against said nozzle without other means of support and said remnant liquid egg material is withdrawn from said egg shell through said conduit, said means including an air impelling device and an air and egg material separating chamber for receiving egg material entrained by and forced from the egg shell half by impelled air, said chamber being of such arrangement that remnant egg material entering the same gravitates to a lower portion thereof, and incoming air leaves the chamber thereabove, so as to prevent foaming of the material in the chamber.

15. In an apparatus for recovering remnant egg material from the interior of egg shell halves, a nozzle shaped to have fitted thereover and to closely conform to the inner surface of an egg shell half from which egg meats have been previously removed, means for impelling air along the inner surface of said shell half and between said surface and said nozzle under relatively slight pressure so as not to break the egg shell half, and an air and egg material separating chamber connected by a closed airtight conduit with the space between the inner surface of the shell half and said nozzle and for receiving therefrom egg material entrained by and forced from the inner surface of the shell half by said impelled air, said chamber being of such arrangement that remnant egg material entering the same gravitates to a lower portion thereof, and incoming air leaves the chamber thereabove, so as to prevent foaming of the material in the chamber.

16. In an apparatus for recovering remnant egg material from the interior of egg shell halves, a nozzle shaped to have fitted thereover and to closely conform to the inner surface of an egg shell half from which egg meats have been previously removed, means for impelling air along the inner surface of said shell half and between said surface and said nozzle under relatively slight pressure so as not to break the egg shell half, and an air and egg material separating chamber in closed airtight communication with the space between the inner surface of the shell half and said nozzle and for receiving therefrom egg material entrained by and forced from the inner surface of the shell half by said impelled air, said chamber being of such arrangement that remnant egg material entering the same gravitates to a lower portion thereof, and incoming air leaves the chamber thereabove, so as to prevent foaming of the material in the chamber, and said nozzle being provided with means whereby the egg shell half is automatically removed therefrom after the remnant egg material has been withdrawn from the shell half.

JOHN C. IRISH.